(12) United States Patent
Kim et al.

(10) Patent No.: US 8,587,740 B2
(45) Date of Patent: Nov. 19, 2013

(54) DISPLAY SUBSTRATE, METHOD OF MANUFACTURING THE SAME, AND DISPLAY DEVICE HAVING THE SAME

(75) Inventors: Jin-Seuk Kim, Daejeon (KR); Young-Wook Lee, Suwon-si (KR); Yui-Ku Lee, Gwangmyeong-si (KR)

(73) Assignee: Samsung Display Co., Ltd. (KR)

( * ) Notice: Subject to any disclaimer, the term of this patent is extended or adjusted under 35 U.S.C. 154(b) by 710 days.

(21) Appl. No.: 12/217,493

(22) Filed: Jul. 2, 2008

(65) Prior Publication Data
US 2009/0008646 A1  Jan. 8, 2009

(30) Foreign Application Priority Data
Jul. 5, 2007 (KR) .................. 10-2007-0067535

(51) Int. Cl.
*G02F 1/136* (2006.01)
*H01L 29/04* (2006.01)

(52) U.S. Cl.
USPC ............................................. 349/43; 257/59

(58) Field of Classification Search
USPC ............................................. 349/43; 257/59
See application file for complete search history.

(56) References Cited

U.S. PATENT DOCUMENTS

| | | | |
|---|---|---|---|
| 2002/0033912 A1 | 3/2002 | Tanaka et al. | |
| 2004/0145687 A1 | 7/2004 | Kim | |
| 2004/0263752 A1* | 12/2004 | Kim | 349/141 |
| 2005/0117093 A1 | 6/2005 | Woong-Kwon et al. | |
| 2005/0121669 A1* | 6/2005 | Kobayashi | 257/40 |
| 2005/0140858 A1 | 6/2005 | Park | |
| 2005/0156243 A1* | 7/2005 | Manning | 257/347 |
| 2006/0098132 A1* | 5/2006 | Shiota et al. | 349/43 |
| 2007/0097311 A1 | 5/2007 | Li et al. | |

FOREIGN PATENT DOCUMENTS

| | | |
|---|---|---|
| JP | 2000-122071 | 4/2000 |
| JP | 2005-345972 | 12/2005 |
| KR | 10-2007-0030375 | 3/2007 |

OTHER PUBLICATIONS

Patent Abstracts of Japan Publication No. 2000-122071, Apr. 28, 2000, 1 p.
Patent Abstracts of Japan Publication No. 2005-345972, Dec. 15, 2005, 1 p.
Korean Patent Abstracts, Publication No. 1020070030375, Mar. 16, 2007, 1 p.
J. J el al., "Color Filter on TFT Array Structure Without the Use of Photolithography Process in Upper Substrate & Organic Insulator in TFT Substrate", SID International Symposium Digest of Technical Papers, Boston, MA, May 24-27, 2005, 3 pages.

* cited by examiner

*Primary Examiner* — Mark Robinson
*Assistant Examiner* — Jerry Blevins
(74) *Attorney, Agent, or Firm* — Innovation Counsel LLP (57) ABSTRACT

A display substrate includes a switching member, a color filter layer, an inorganic insulation layer and a pixel electrode. The switching member includes a gate line, a data line crossing the gate line, and a thin-film transistor (TFT) electrically connected to the gate line and the data line. The color filter layer is formed on the switching member. The inorganic insulation layer is formed on the color filter layer. The inorganic insulation layer has a hole formed thereon, which exposes a portion of the color filter layer in correspondence with the TFT. The pixel electrode is formed on the inorganic insulation layer.

9 Claims, 9 Drawing Sheets

DISPLAY SUBSTRATE, METHOD OF MANUFACTURING THE SAME, AND DISPLAY DEVICE HAVING THE SAME

CROSS-REFERENCE TO RELATED APPLICATIONS

This application claims priority under 35 U.S.C. §119 to Korean Patent Application No. 2007-67535, filed on Jul. 5, 2007 in the Korean Intellectual Property Office (KIPO), the contents of which are herein incorporated by reference in their entirety.

BACKGROUND OF THE DISCLOSURE

1. Field of the Disclosure

The present disclosure relates to a display substrate, a method of manufacturing the display substrate and a display device having the display substrate. More particularly, the present disclosure relates to a display substrate used for a display device, a method of manufacturing the display substrate, and a display device having the display substrate.

2. Description of the Related Art

A liquid crystal display (LCD) device includes a thin-film transistor (TFT) substrate, a color filter substrate facing the TFT substrate, and a liquid crystal layer interposed between the TFT substrate and the color filter substrate.

The TFT substrate includes a signal line formed on an insulation substrate, a TFT and a pixel electrode for independently driving a plurality of pixels. The color filter substrate includes a color filter layer including a red color filter, a green color filter and a blue color filter, and a common electrode facing the pixel electrode of the TFT substrate. There may be a decrease in quality if the TFT substrate and the color filter substrate are misaligned.

An LCD device having a color filter on array (COA) structure, in which a color filter layer is formed on the TFT substrate, has been developed in order to mitigate the decrease in quality due to misalignment between the TFT substrate and the color filter substrate.

The TFT substrate having the COA structure may include an inorganic insulation layer covering the color filter layer in order to prevent harmful gas from flowing out of the color filter layer.

When the inorganic insulation layer formed on the color filter layer is harder than the color filter layer, the compressibility of the color filter layer corresponding to a contact portion of the column spacer may be reduced. As a result, the spreadability of liquid crystal molecules may be reduced, resulting in the formation of portions of the LCD between TFT substrate and the color filter substrate that do not fill up with liquid crystal molecules. The areas that are not filled with liquid crystal molecules may produce a reddish defect when that portion or the LCD is in a black state.

SUMMARY OF THE DISCLOSURE

The present disclosure provides a display substrate capable of increasing display quality by enhancing compression characteristics of a liquid crystal display (LCD) device having a color filter on array (COA) structure.

The present disclosure also provides a method of manufacturing the above-mentioned display substrate.

The present disclosure also provides a display device having the display substrate.

In one aspect of the present disclosure, a display substrate includes a switching member, a color filter layer, an inorganic insulation layer and a pixel electrode. The switching member includes a gate line, a data line crossing the gate line, a thin-film transistor (TFT) electrically connected to the gate line and the data line. The color filter layer is formed on the switching member. The inorganic insulation layer is formed on the color filter layer. The inorganic insulation layer has a hole formed thereon, which exposes a portion of the color filter layer in correspondence with the TFT. The pixel electrode is formed on the inorganic insulation layer.

In an exemplary embodiment, the inorganic insulation layer may include silicon nitride (SiNx).

In an exemplary embodiment, the color filter layer may include a red color filter, a green color filter and a blue color filter formed in correspondence with each pixel.

In an exemplary embodiment, the switching member may further include a storage electrode formed from a metal layer for forming the gate line. Here, the color filter layer may have a storage hole formed thereon, which exposes a portion of the TFT layer in correspondence with the storage electrode.

In an exemplary embodiment, the switching member may further include a gate insulation layer and a protective layer. The gate insulation layer is formed on an insulation substrate having the gate line. The protective layer is formed on the insulation substrate having the gate line, the gate insulation layer, the data line and the TFT formed thereon. Here, the protective layer, the color filter layer and the inorganic insulation layer may further have a contact hole that exposes a portion of the drain electrode of the TFT.

In an exemplary embodiment of the present disclosure, a method of manufacturing the display substrate may include forming a switching member on an insulation substrate. The switching member may include a gate line, a data line crossing the gate line, and a TFT electrically connected to the gate line and the data line. A color filter layer may be formed on the switching member. An inorganic insulation layer may be formed on the color filter layer, the color filter layer having a hole exposing a portion of the color filter layer in correspondence with the TFT. A pixel electrode is formed on the inorganic insulation layer.

In order to manufacture the switching member, a first metal pattern is formed on the insulation substrate. The first metal pattern may include the gate line, a gate electrode of the TFT and a storage electrode. A gate insulation layer is formed on the insulation substrate having the metal pattern formed thereon. Then, a second metal pattern is formed on the gate insulation layer, the second metal pattern including the data line, and source and drain electrodes of the TFT. A protective layer may be formed on the insulation substrate having the second metal pattern formed thereon.

In order to manufacture the color filter layer, a red color filter, a green color filter and a blue color filter are formed on the switching member. Then, a storage hole and a first contact hole are formed on each of the red, green and blue color filters. The storage hole may expose a portion of the switching member corresponding with the storage electrode. The first contact hole may expose a portion of the switching member corresponding with the drain electrode.

In order to manufacture the inorganic insulation layer, an inorganic material may be formed on the color filter layer having the storage hole and the first contact hole formed thereon. A hole and a second contact hole may be formed by patterning the inorganic insulation material. The hole may expose a portion of the color filter layer corresponding with the TFT. The second contact hole may expose a portion of the switching member corresponding with the drain electrode. A third contact hole that exposes a portion of the drain electrode may be formed through the protective layer. The second contact hole may be formed on the color filter layer coincident with the same process used to form the third contact hole.

In another exemplary embodiment, a display device includes a first substrate, a second substrate, a liquid crystal layer and a column spacer. The second display substrate faces the first display substrate. The liquid crystal layer is interposed between the first display substrate and the second display substrate. The column spacer is disposed between the first display substrate and the second display substrate to maintain a cell gap between the first display substrate and the second display substrate. The first display substrate includes a switching member, a color filter, an inorganic insulation layer and a pixel electrode. The switching member includes a gate line, a data line crossing the gate line, and a TFT electrically connected to the gate line and the data line. The color filter layer is formed on the switching member. The inorganic insulation layer is formed on the color filter layer. The inorganic insulation layer has a spacer hole formed thereon, which exposes a portion of the color filter layer corresponding with the column spacer. The pixel electrode is formed on the inorganic insulation layer.

According to the display substrate described above, the method of manufacturing the display substrate and the display device having the display substrate, an inorganic insulation layer corresponding to a column spacer is removed, forming a spacer hole, in order to improve the compression characteristics of the color filter layer. Therefore, the formation of unfilled areas of liquid crystal molecules may be prevented or reduced, and the corresponding display quality defects due to the unfilled areas may be prevented or reduced.

BRIEF DESCRIPTION OF THE DRAWINGS

The above and other advantages of the present disclosure will become readily apparent by reference to the following detailed description when considered in conjunction with the accompanying drawings wherein.

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
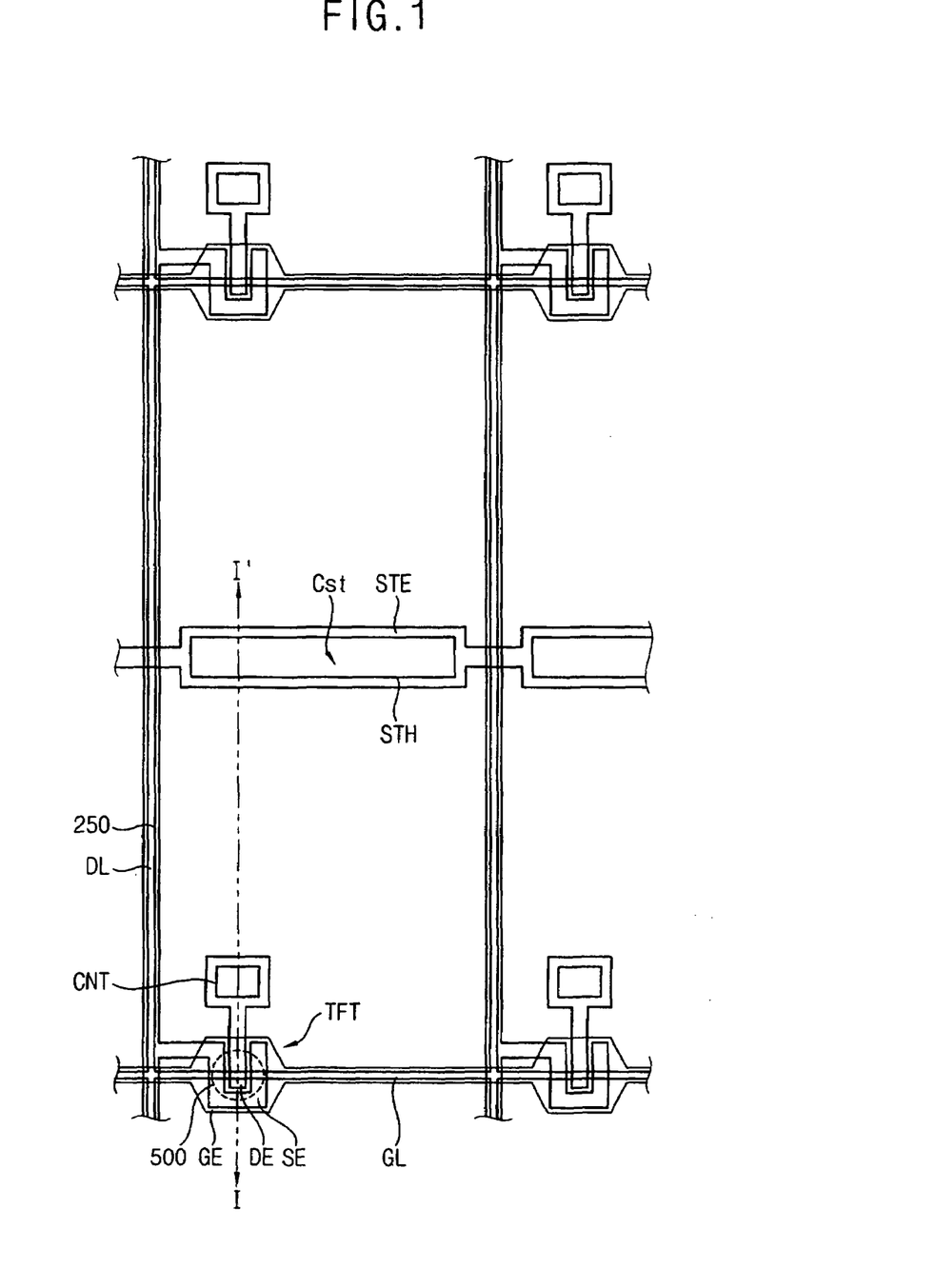
FIG. 1 is a plan view illustrating a display device according to an exemplary embodiment of the present invention.
Figure 2:
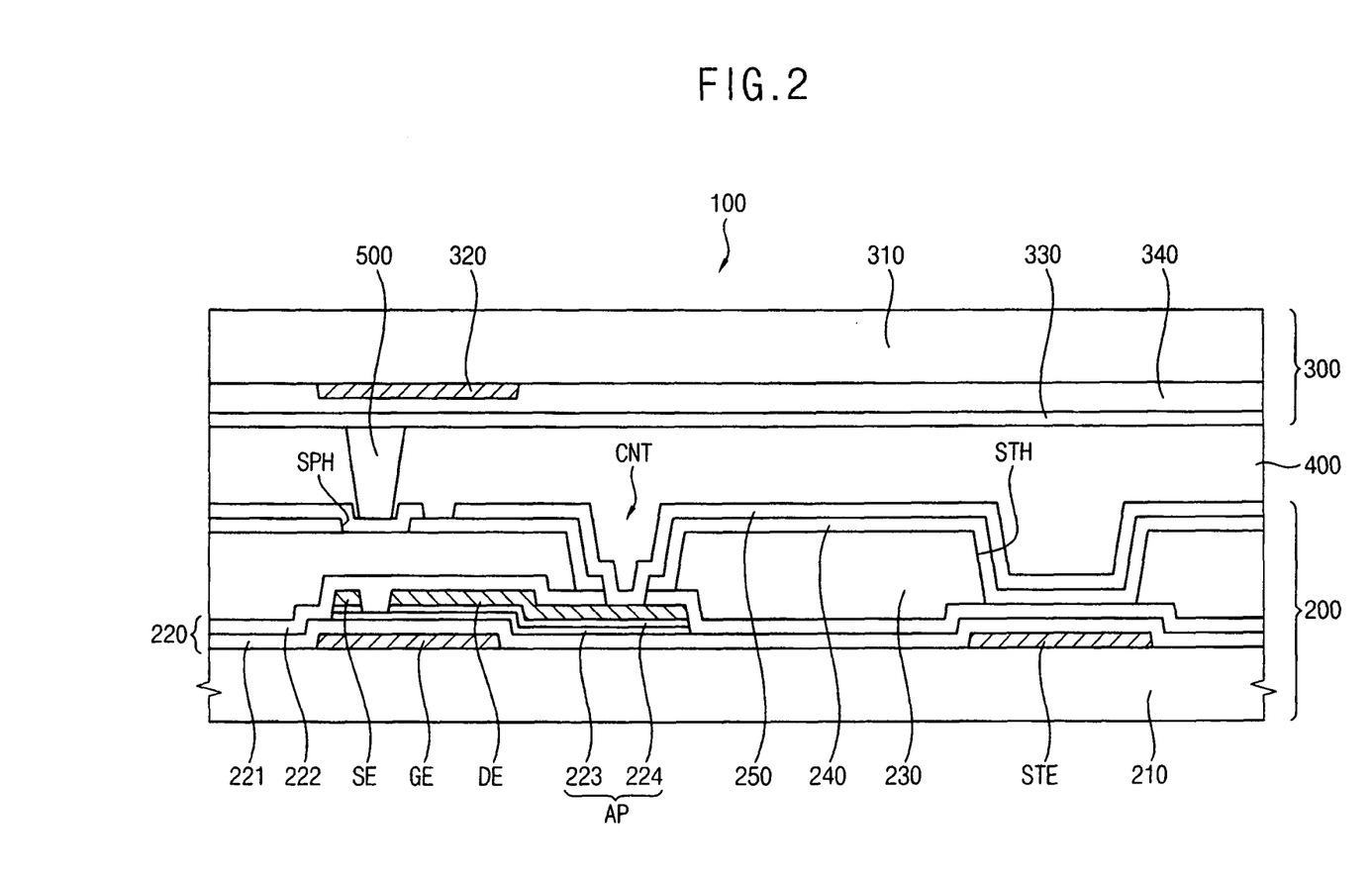
FIG. 2 is a cross-sectional view taken along the lines I-I' in FIG. 1.

FIG. 1 is a plan view illustrating a display device according to an exemplary embodiment of the present invention. FIG. 2 is a cross-sectional view taken along the lines I-I' in FIG. 1.

Referring to FIGS. 1 and 2, in an exemplary embodiment, a display device 100 may include a first display substrate 200, a second display substrate 300, a liquid crystal layer 400 and a column spacer 500. The second display substrate 300 faces the first display substrate 200. The liquid crystal layer 400 is interposed between the first display substrate 200 and the second display substrate 300. The column spacer 500 is disposed between the first display substrate 200 and the second display substrate 300 to maintain a cell gap between the first display substrate 200 and the second display substrate 300.

The first display substrate 200 may include a first insulation substrate 210, a switching member 220, a color filter layer 230, an inorganic insulation layer 240 and a pixel electrode 250.

The first insulation substrate 210 may include transparent glass and a plastic material.

The switching member 220 may be formed on the first insulation substrate 210. The switching member 220 may include a gate line GL, a data line DL and a thin-film transistor (TFT). The switching member 200 may further include a gate insulation layer 221 and a protective layer 222.

The gate line GL may be formed on the first insulation substrate 210. The gate line GL may be extended along a horizontal direction when viewed from a plan view.

The gate insulation layer 221 may be formed on the first insulation substrate 210 having the gate line GL formed thereon. The gate insulation layer 221 may include, for example, silicon nitride (SiNx) or silicon oxide (SiOx).

The data line DL is formed on the gate insulation layer 221. The data line DL may be extended along a direction that is different from the horizontal direction so as to cross the gate line GL. The data line DL may be extended along a vertical direction when viewed from a plan view. The data line DL is electrically isolated from the gate line GL through the gate insulation layer 221.

The TFT is electrically connected to the gate line GL and the data line DL. The TFT may include a gate electrode GE, an active pattern AP, a source electrode SE and a drain electrode DE.

The gate electrode GE is electrically connected to the gate line GL to perform a gate terminal function of the TFT.

The active pattern AP may be formed on the gate insulation layer 221. The active pattern AP may be formed below the source electrode SE, the drain electrode DE and the data line DL. Alternatively, the active pattern AP may be formed only in a portion that is overlapped with the gate electrode GE.

The active pattern AP may include a semiconductor layer 223 and an ohmic contact layer 224. The semiconductor layer 223 may perform a role of a channel through which current flows. The ohmic contact layer 224 may perform a role of decreasing a contact resistance between the semiconductor layer 223 and the source and drain electrodes SE and DE. For example, the semiconductor layer 223 may include amorphous silicon (a-Si). The ohmic contact layer 224 may include n+ amorphous silicon (n+ a-Si) that is formed by implanting n+ impurities at a high concentration. For example, phosphorous (P) may be implanted into an upper portion of the semiconductor layer 223 to form the ohmic contact layer 224. The ohmic contact layer 224 may be partially removed so that the semiconductor layer 223 is partially exposed.

The source electrode is electrically connected to the data line DL. The source electrode SE may be formed on the active pattern AP to perform a source terminal function of the TFT.

The drain electrode DE may be spaced apart from the source electrode SE on the active pattern AP to perform a drain terminal function of the TFT.

The data line DL, the source electrode SE, the drain electrode DE and the active pattern AP may be patterned through one masking process, so that an outline of the active pattern AP may be substantially identical to an outline of the data line DL, the source electrode SE and the drain electrode DE.

The TFT may be arranged to apply a data voltage applied through the data line DL to the pixel electrode 250 in response to a gate voltage applied through the gate line GL.

The protective layer 222 is formed on the first insulation substrate 210 having the gate line GL, the gate insulation layer 221, the data line DL and the TFT formed thereon. The protective layer 222 may include, for example, silicon nitride (SiNx) or silicon oxide (SiOx).

The switching member 220 may further include a storage electrode STE. The storage electrode STE may be formed from the same metal layer used to form the gate line GL. The storage electrode STE may be parallel with the gate line GL between the gate lines GL adjacent to each other.

The storage electrode STE is opposed to the pixel electrode 250 by the gate insulation layer 221, the protective layer 222 and the inorganic insulation layer 240 which are interposed therebetween to form a storage capacitor Cst. Thus, a data voltage applied to the pixel electrode 250 through the TFT may be maintained by the storage capacitor Cst during one frame interval.

The color filter layer 230 may be formed on the switching member 220. The color filter layer 230 may include a red color filter, a green color filter and a blue color filter formed in correspondence with each pixel. For example, the red color filter may include an organic composition and red dyes or red pigments, the green color filter may include an organic composition and green dyes or green pigments, and the blue color filter may include an organic composition and blue dyes or blue pigments. The red, green and blue color filters may be formed on the protective layer 222 and may have a uniform pattern. For example, the red, green and blue color filters may be sequentially arranged along a horizontal direction or a vertical direction so that one color filter corresponds to one pixel.

The color filter layer 230 may include a relatively high thickness in order to planarize a surface of the first display substrate 200. A thickness of the color filter layer 230 may have a range of about 2.5 μm to about 3.5 μm. The color filter layer 230 may be formed on the first display substrate 200, so that organic insulation for planarizing the first display substrate 200 may be omitted. Therefore, the light transmittance of a liquid crystal display (LCD) device may be increased, and manufacturing costs of the LCD device may be reduced.

The color filter layer 230 may include a storage hole STH exposing at least one portion of the switching member 200 corresponding to a position of the storage electrode STE. A distance between the storage electrode STE and the pixel electrode 250 is decreased through the storage hole STH, so that the capacitance of the storage capacitor Cst may be increased.

The inorganic insulation layer 240 may be formed on the color filter layer 230. The inorganic insulation layer 240 may prevent harmful gas from flowing out of the color filter layer 240 and may prevent contamination of the liquid crystal layer 400, so that display quality may be enhanced.

The inorganic insulation layer 240 may be formed between the color filter layer 230 and the pixel electrode 250. The inorganic insulation layer 240 may prevent the liquid crystal layer 400 and an alignment layer (not shown) disposed on the pixel electrode 250 from directly contacting the color filter layer 230 through an opening area of the pixel electrode 250. Therefore, the inorganic insulation layer 240 may prevent harmful gas from flowing out of the color filter layer 230 including a photosensitive composition and infiltrating into the liquid crystal layer 400 through the alignment layer. Furthermore, a chemical reaction between the color filter layer 230 and the alignment layer may be prevented.

The inorganic insulation layer 240 may include an inorganic material having low reactivity with organic material in order to prevent harmful gas from flowing out. For example, the inorganic insulation layer 240 may include silicon nitride (SiNx).

The inorganic insulation layer 240 may be formed through a low temperature deposition process of about 100° C. to about 250° C. in order to prevent damage such as through pyrolysis of the color filter layer 230 including a photosensitive organic composition. For example, the inorganic insulation layer 240 may be formed through a chemical vapor deposition (CVD) process at a temperature of about 160° C. to about 180° C. The inorganic insulation layer 240 may be formed with a thickness of about 500 Å to about 2,000 Å in order to prevent gas from flowing out of the color filter layer 230.

The inorganic insulation layer 240 includes a spacer hole SPH exposing a portion of the color filter layer 230. The spacer hole SPH may be formed in a position corresponding to the column spacer 500. Furthermore, the spacer hole SPH is formed on the TFT. For example, the spacer hole SPH may be formed on a channel portion of the TFT.

When the inorganic insulation layer 240 is disposed between the color filter layer 230 and the column spacer 500, the compressibility of the color filter layer 230 corresponding to a contact portion of the column spacer 500 may be decreased. In an exemplary embodiment, the inorganic insulation layer 240 may include an inorganic material that is harder than the color filter layer 230 which may include an organic material. Thus, the spreadability of liquid crystal molecules is decreased, so that portions in which the liquid crystal molecules are not fully filled up may be formed.

In an exemplary embodiment, removing a portion of the inorganic insulation layer 240 corresponding to the column spacer 500 may increase the compressibility of the color filter layer 230 corresponding to the column spacer 500, which may help prevent display quality defects due to unfilled areas of liquid crystal molecules.

Figure 3A:
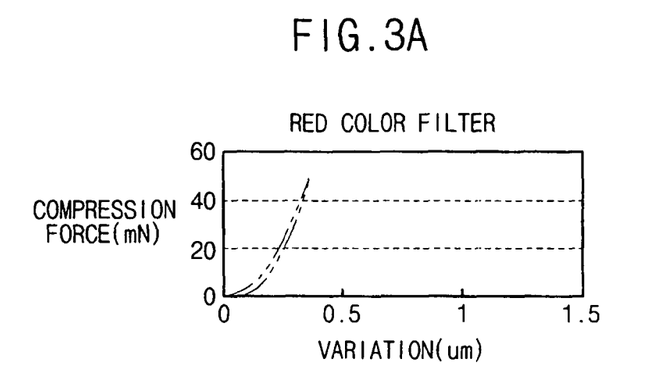
FIGS. 3A to 3C are graphs showing compression characteristics of a red color filter, a green color filter and a blue color filter when an inorganic insulation layer is formed.
Figure 3B:
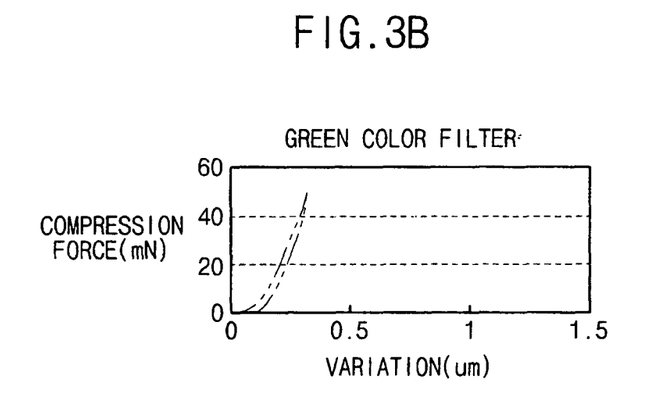
Figure 3C:
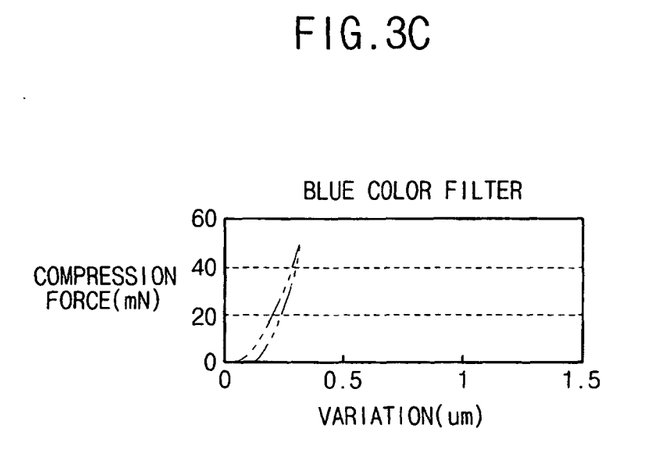
Figure 4A:
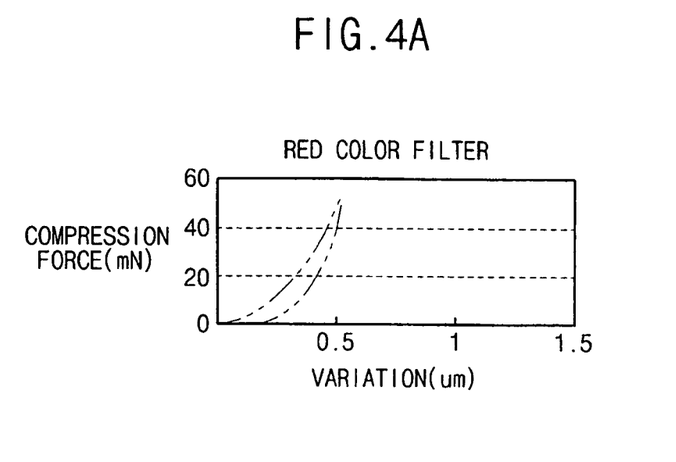
FIGS. 4A to 4C are graphs showing compression characteristics of a red color filter, a green color filter and a blue color filter when an inorganic insulation layer is not formed.
Figure 4B:
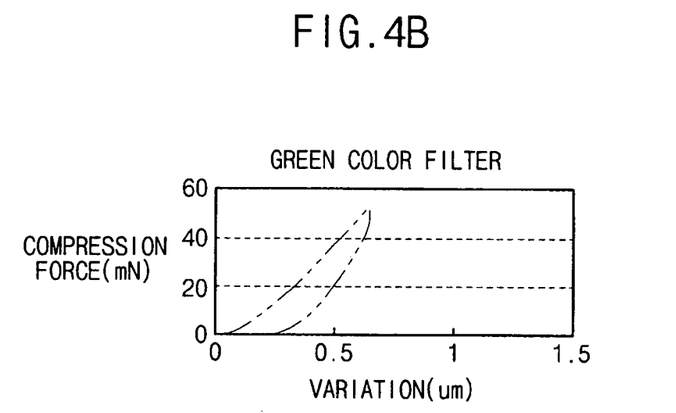
Figure 4C:
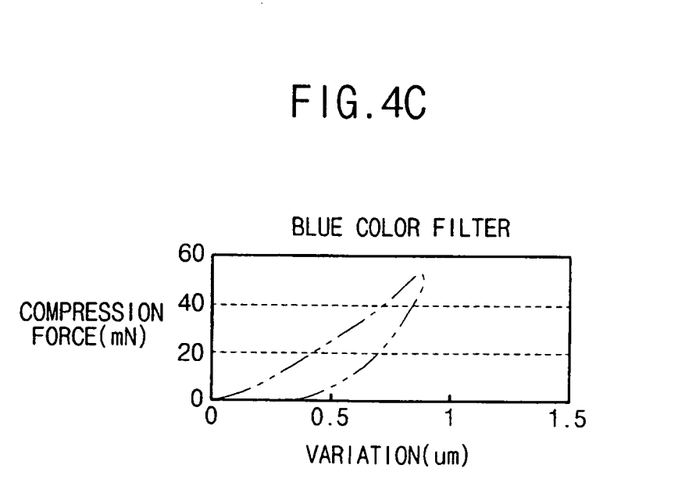

FIGS. 3A to 3C are graphs showing compression characteristics of a red color filter, a green color filter and a blue color filter, respectively, when an inorganic insulation layer is present. FIGS. 4A to 4C are graphs showing compression characteristics of a red color filter, a green color filter and a blue color filter, respectively, when an inorganic insulation layer is not present. The graphs as shown in FIGS. 3A to 4C will be described in the following Table 1. In FIGS. 3A to 4C, the x-axis denotes the compressibility applied to combine the first display substrate and the second display substrate, and the y-axis denotes variation quantities of the red, green and blue color filters in accordance with the compressibility.

TABLE 1

| Inorganic Insulation Layer | Color Filter | Variation Quantity (μm) | Recovery Ratio (%) |
|---|---|---|---|
| Formed | Red | 0.357 | 72 |
| | Green | 0.326 | 74 |
| | Blue | 0.325 | 74 |
| Not formed | Red | 0.534 | 67 |
| | Green | 0.661 | 68 |
| | Blue | 0.926 | 61 |

Referring to FIGS. 3 and 4 and Table 1, the results of detecting variation quantities of the red, green and blue color filters, which were detected in accordance with whether or not the inorganic insulation layer has been formed, minor significant differences existed among the color filters. However, the variation quantities of the red, green and blue color filters in the case where the inorganic insulation layer was formed were higher than those in the case where the inorganic insulation layer was not formed.

When variation quantities of the red, green and blue color filters are increased, the second display substrate 300 becomes closer to the first display substrate 200 so that the spreadability of liquid crystal molecules may be increased. Thus, unfilled areas of liquid crystal molecules may be prevented.

Referring back to FIGS. 1 and 2, the pixel electrode 250 may be formed on the inorganic insulation layer 240 corresponding to each pixel. The pixel electrode 250 may include an optically transparent and electrically conductive material in order to transmit light. For example, the pixel electrode 250 may include indium zinc oxide (IZO), indium tin oxide (ITO) or other suitable materials.

The pixel electrode 250 may be electrically connected to the drain electrode DE of the TFT. A contact hole CNT may be formed on the protective layer 222, the color filter 230 and the inorganic insulation layer 240 in order to electrically connect to the pixel electrode 250 and the drain electrode DE. The pixel electrode 250 is electrically connected to the drain electrode DE through the contact hole CNT.

The pixel electrode 250 may be opposite to the storage electrode STE by interposing the inorganic insulation layer 240, the protective layer 222 and the gate insulation layer 221 therebetween to form the storage capacitor Cst in a storage hole area STH of the color filter layer 230.

The pixel electrode 250 may include a predetermined opening pattern for dividing each of pixels into a plurality of domains so as to realize a wide viewing angle. The pixel electrode 250 may include a divided structure of a main electrode and a sub-electrode that receive different voltages. As described, when the pixel electrode 250 is divided into the main electrode and the sub-electrode, two TFTs electrically connected to the main electrode and the sub-electrode may be formed in each pixel.

The second display substrate 300 may be combined with the first display substrate 200 by interposing the liquid crystal layer 400. The second display substrate 300 may include a second insulation substrate 310, a black matrix 320 and a common electrode 330.

The second insulation substrate 310 may include transparent glass and a plastic material.

The black matrix 320 may be formed on the second insulation substrate 310. The black matrix 320 is formed to cover at least one column spacer 500. Furthermore, the black matrix 320 may be formed corresponding to a portion between the pixel electrodes 250 which corresponds to a boundary portion of the pixels. That is, the black matrix 320 may be formed in the boundary portion of the pixels, so that the light transmittance is blocked to enhance the contrast ratio of the LCD device. For example, the black matrix 320 may be formed corresponding with the gate line GL, the data line DL, the storage electrode STE and the TFT.

The common electrode 330 may include an optically transparent and electrically conductive material in order to transmit light. For example, the common electrode 330 may include indium zinc oxide (IZO), indium tin oxide (ITO) or other suitable material. The common electrode 330 may include an opening pattern formed thereon in order to realize a wide viewing angle.

The second display substrate 300 may include an overcoat layer 340 formed between the second insulation substrate 310 and the common electrode 330. The overcoat layer 340 may be formed on the second display substrate 300 in order to planarize a surface of the second display substrate 300 having the black matrix 320 formed thereon.

The liquid crystal layer 400 may have liquid crystal molecules having optical and electrical properties, such as an anisotropic refractive index and an anisotropic dielectric constant. When a data voltage is applied to the pixel electrode 250, electric fields may be generated between the pixel electrode 250 and the common electrode 330 to alter an orientation of the liquid crystal molecules in the liquid crystal layer 400. When the orientation of the liquid crystal molecules is altered, the optical transmissivity of the liquid crystal layer is changed, so as to display an image.

The column spacer 500 may be partially formed between the first display substrate 200 and the second display substrate 300 to maintain a cell gap between the first display substrate 200 and the second display substrate 300. The column spacer 500 may be formed at a location corresponding to the TFT, so that a decrease of an aperture ratio may be prevented. For example, a column spacer 500 may be formed for groups of a predetermined number of pixels. For another example, a column spacer 500 may be formed in one pixel.

Hereinafter, a manufacturing method of the first display substrate as shown in FIGS. 1 and 2 is explained referring to FIGS. 5 and 9.

FIGS. 5 to 9 are cross-sectional views illustrating an exemplary embodiment of a method of manufacturing the first display substrate of FIGS. 1 and 2 in accordance with an exemplary embodiment of the present invention.

Figure 5:
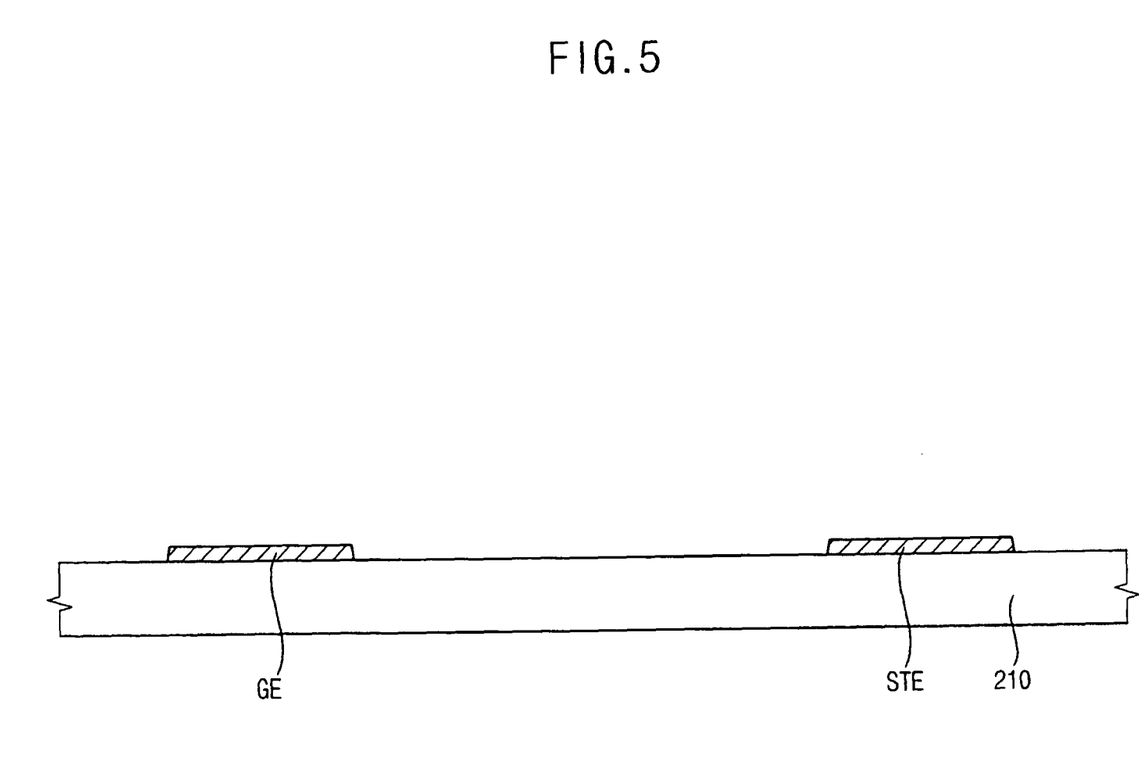
FIGS. 5 to 9 are cross-sectional views illustrating a method of manufacturing the first display substrate of FIGS. 1 and 2 in accordance with an exemplary embodiment of the present invention.

Referring to FIGS. 1 and 5, a first metal pattern may be formed on the first insulation substrate 210, which includes the gate line GL, the gate electrode GE of the TFT and the storage electrode STE. The gate electrode GE is electrically isolated from the gate line GL and the gate electrode GE, and the storage electrode STE is electrically isolated from the gate line GL and the gate electrode GE.

The first metal pattern may include a single-layer structure, a double-layer structure, a multilayer structure, etc. In one example, when the first metal pattern includes the single-layer structure, the first metal pattern is formed from a single metallic material such as aluminum (Al), molybdenum (Mo), neodymium (Nd), chromium (Cr), tantalum (Ta), titanium (Ti), tungsten (W), copper (Cu), silver (Ag), etc., or a metal alloy thereof. In another example, when the first metal pattern includes the double-layer structure, a lower metal layer of the first metal pattern is formed from relatively high mechanical and chemical characteristics such as aluminum (Al) and an upper metal layer of the first metal pattern is formed from a relatively low resistance metal such as molybdenum (Mo), a molybdenum alloy or other suitable material.

Figure 6:
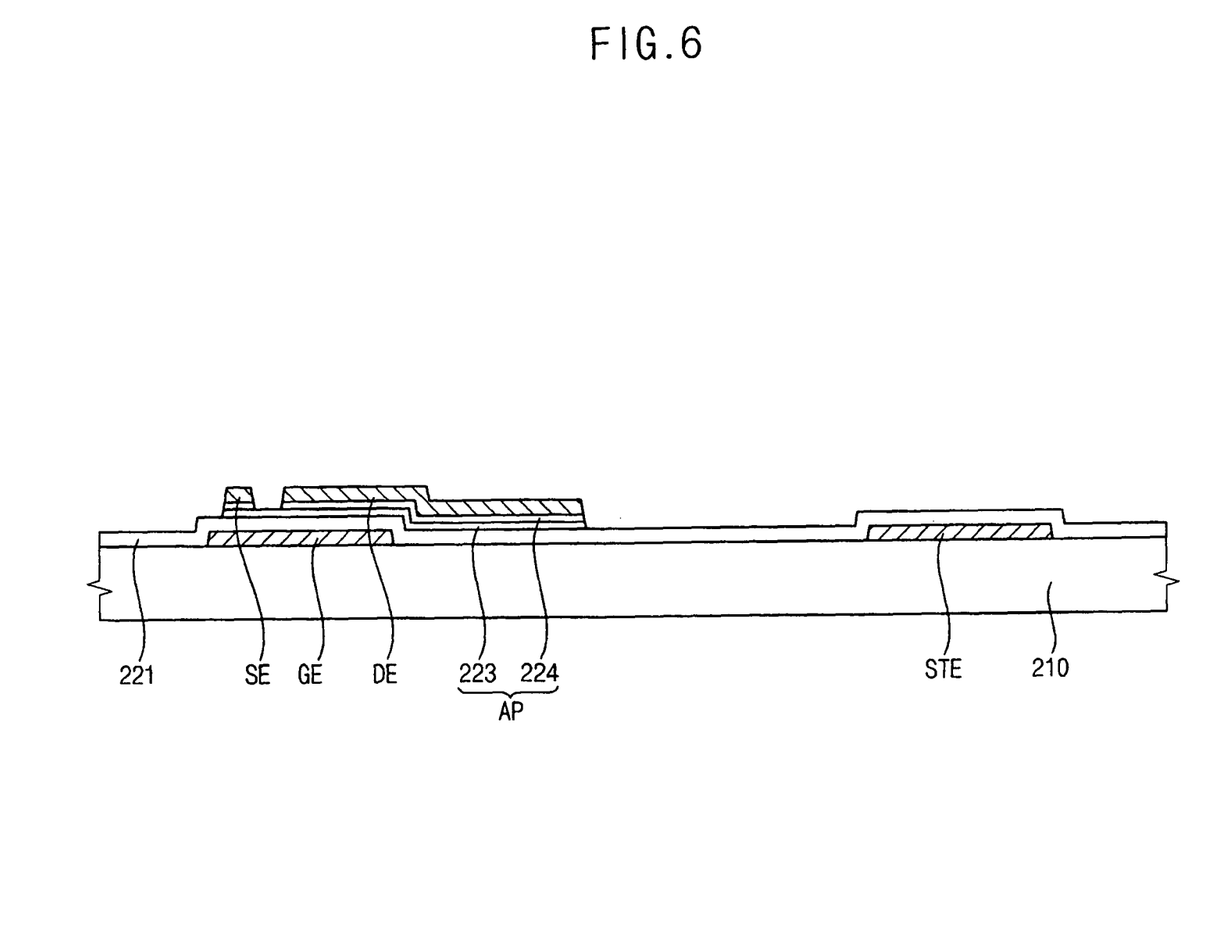

Referring to FIGS. 1 and 6, the gate insulation layer 221 may be formed on the first insulation substrate 210 having the first metal pattern formed thereon so as to cover the first metal pattern. The gate insulation layer 221 may include, for example, silicon nitride (SiNx) or silicon oxide (SiOx). The gate insulation layer 221 may have a thickness of about 1,500 Å to about 2,500 Å.

The second metal pattern may be formed on the gate insulation layer 221. The second metal pattern may include the active pattern AP, the data line DL, source and drain electrodes of the TFT. The active pattern AP and the second metal pattern may be patterned through one mask process using one mask. When the active pattern AP and the second metal pattern are patterned through the one mask process, the active pattern AP may be formed with substantially the same shape as the second metal pattern. That is, the active pattern AP may be formed between the gate insulation layer 221 and the second metal pattern. Alternatively, the active pattern AP and the second metal pattern may be patterned through two mask processes using two masks different from each other. When the active pattern AP and the second metal pattern are patterned through the two mask processes, the active pattern AP may be partially formed in an overlapped portion in which the active pattern AP is overlapped with the gate electrode GE when viewed from a plan view of the first display substrate.

The active pattern AP may include a semiconductor layer 223 and an ohmic contact layer 224. For example, the semiconductor layer 223 may include amorphous silicon (a-Si), and the ohmic contact layer 224 may include n+ amorphous silicon (n+ a-Si). In an exemplary embodiment, n+ impurities are implanted into the amorphous silicon layer (a-Si) at a high concentration to form the ohmic contact layer 224.

The source electrode SE may be electrically connected to the data line DL, and the drain electrode DE is spaced apart from the source electrode SE on the gate electrode GE so as to form a channel of the TFT.

The second metal pattern may include a triple-layer structure of Mo/Al/Mo in which a lower molybdenum (Mo) layer, an aluminum (Al) layer and an upper molybdenum (Mo) layer are sequentially deposited. Alternatively, the second metal pattern may include a single-layer structure or a multilayer structure. When the second metal pattern includes the single-layer structure, the second metal pattern may be formed from a single metallic material such as aluminum (Al), molybdenum (Mo), neodymium (Nd), chromium (Cr), tantalum (Ta), titanium (Ti), tungsten (W), copper (Cu), silver (Ag), or other suitable material, or a metal alloy thereof.

In order to form the TFT, the ohmic contact layer 224 of the channel portion may be removed, corresponding to a gap between the source electrode SE and the drain electrode DE.

Figure 7:
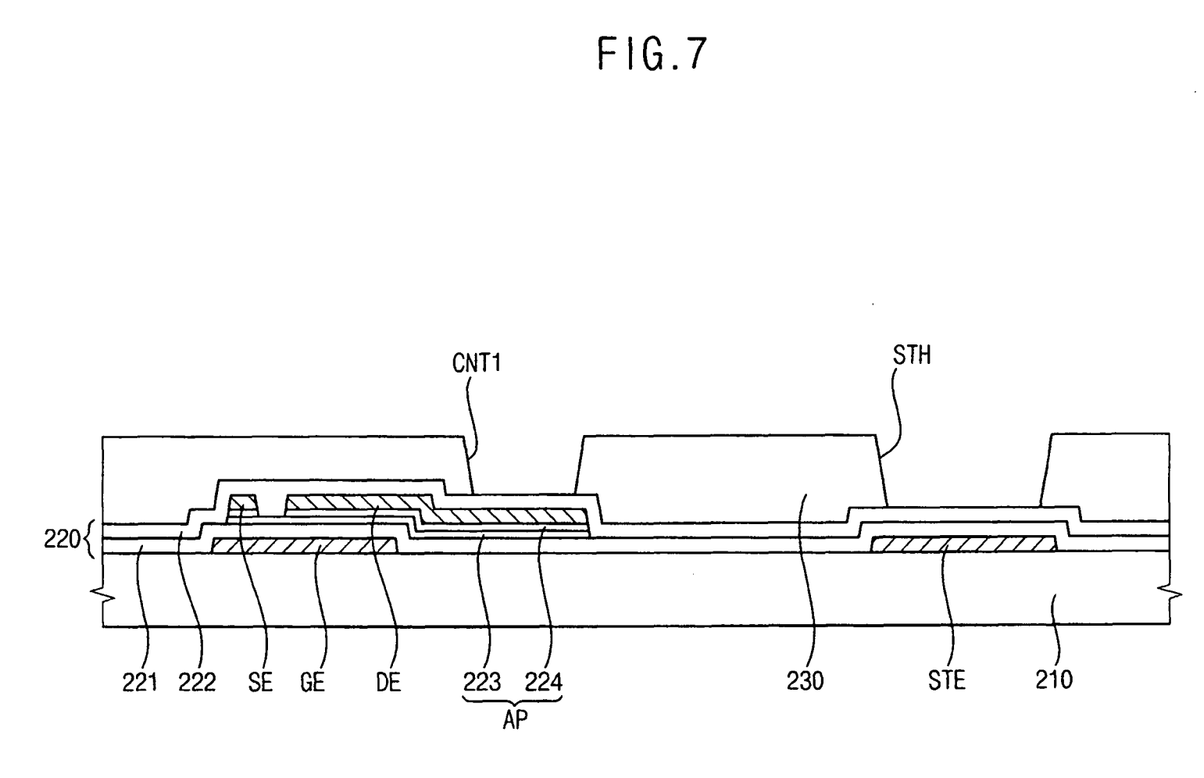

Referring to FIGS. 1 and 7, the protective layer 222 may be formed on the first insulation substrate 210 having the second metal pattern formed thereon to cover the second metal pattern. The protective layer 222 may include, for example, silicon nitride (SiNx) or silicon oxide (SiOx). Accordingly, the manufacturing process of the switching member 220 is completed.

The color filter layer 230 may be formed on the switching member 220. The color filter layer 230 may include a red color filter, a green color filter and a blue color filter formed in correspondence with each pixel. The red, green and blue color filters may be sequentially formed so that one color filter corresponds to one pixel.

The storage hole STH and the first contact hole CNT1 may be formed in each of the red, green and blue color filters. The storage hole STH may expose a portion of the switching member 230 corresponding to the storage electrode STE. The first contact hole CNT1 may expose a portion of the switching member 230 corresponding to the drain electrode DE.

Figure 8:
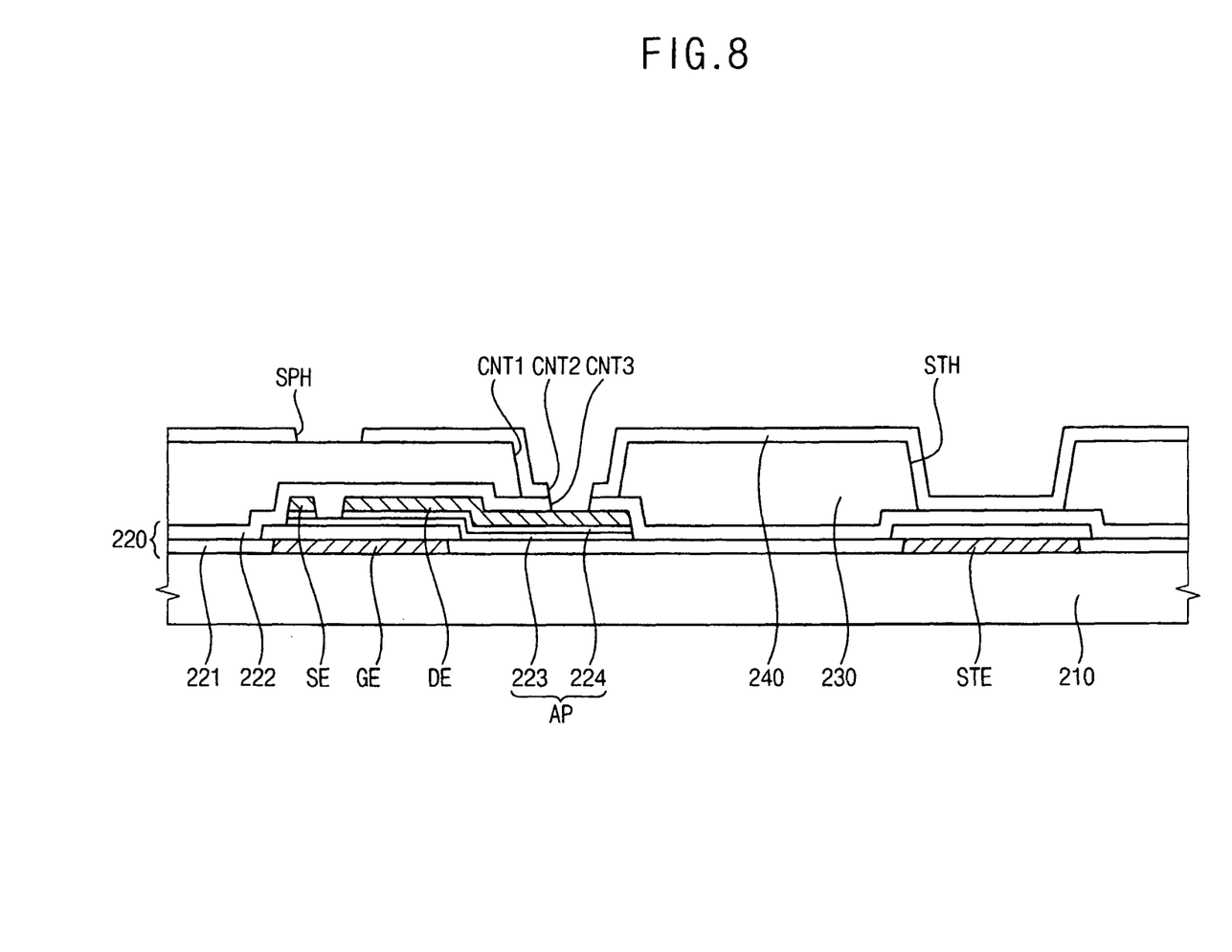

Referring to FIGS. 1 and 8, an organic material may be deposited on the color filter layer 230 having the storage hole STH and the first contact hole CNT1 formed thereon. The organic material may be patterned to form the inorganic insulation layer 240 having the spacer hole SPH and the second contact hole CNT2 formed thereon. The spacer hole SPH may expose a portion of the color filter layer 230 corresponding to the TFT. For example, the spacer hole SPH may expose a portion of the color filter layer 230 corresponding to the channel portion of the TFT. The second contact hole CNT may expose a portion of the switching member 220 corresponding to the drain electrode DE.

The third contact hole CNT3, which exposes a portion of the drain electrode DE, may be formed through the protective layer 222. When the protective layer 222 and the inorganic insulation layer 240 are formed from the same silicon nitride (SiNx), the second contact hole CNT2 and the third contact hole CNT3 may be simultaneously formed. Therefore, the first to third contact holes CNT1, CNT2 and CNT3 may define a contact hole CNT that exposes a portion of the drain electrode DE.

Figure 9:
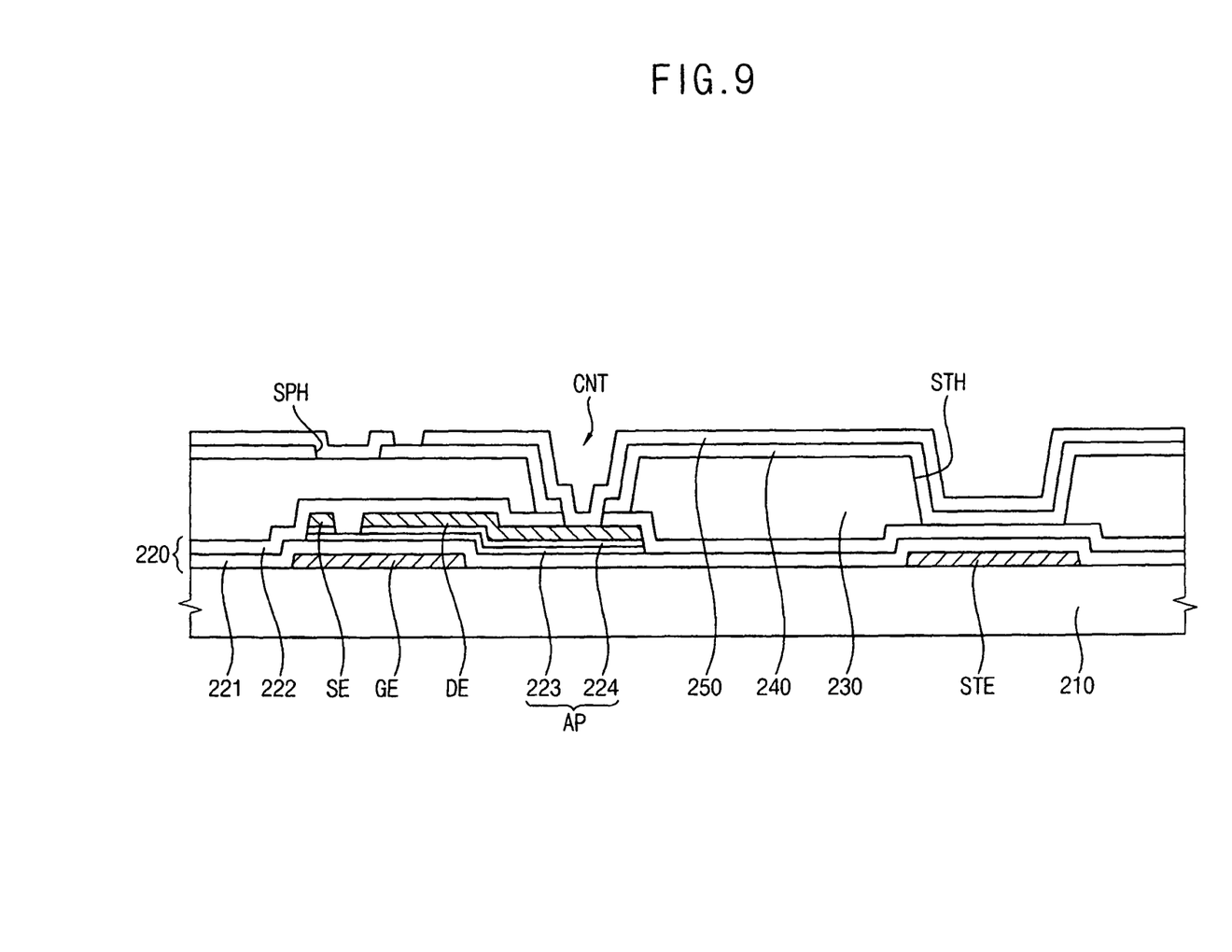

Referring to FIGS. 1 and 9, the pixel electrode 250 may be formed on the inorganic insulation layer 240 having the spacer hole SPH and the third contact hole CNT3 formed thereon. The pixel electrode 250 may include an optically transparent and electrically conductive material in order to transmit light. For example, the pixel electrode 250 may include indium zinc oxide (IZO), indium tin oxide (ITO), etc. The pixel electrode 250 may have a thickness of about 500 Å to about 600 Å.

The pixel electrode 250 may be electrically connected to the drain electrode DE through the contact hole CNT formed on the inorganic insulation layer 240, the color filter layer 230 and the protective layer 222. Furthermore, the pixel electrode 250 is opposed to the storage electrode STE by an inorganic insulation layer 240, the protective layer 222 and the gate insulation layer 221, which are interposed therebetween to form the storage capacitor Cst.

According to the above display substrate, the method of manufacturing the display substrate and the display device having the display substrate, an inorganic insulation layer corresponding to a column spacer is removed, so that compression characteristics of the color filter layer may be improved. Therefore, unfilled areas of liquid crystal molecules may be prevented, and display quality defects due to the unfilled areas may be prevented.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method of manufacturing a display substrate, the method comprising:
    forming a switching member including a gate line, a data line crossing the gate line, and a TFT electrically connected to the gate line and the data line on an insulation substrate;
    forming a color filter layer on the switching member;
    forming an inorganic insulation layer on the color filter layer, the inorganic insulation layer having a hole extending therethrough and exposing a top surface portion of a color filter of the color filter layer; and
    forming a pixel electrode on the inorganic insulation layer, wherein the hole is positioned over a channel portion of the TFT,
    wherein the forming of the switching member comprises:
        forming a first metal pattern including the gate line, a gate electrode of the TFT, and a storage electrode on the insulation substrate;
        forming a gate insulation layer on the insulation substrate having the metal pattern formed thereon;
        forming a second metal pattern including the data line, and source and drain electrodes of the TFT on the gate insulation layer; and
        forming a protective layer on the insulation substrate having the second metal pattern formed thereon,
    wherein the forming of the color filter layer comprises:
        forming a red color filter, a green color filter and a blue color filter on the switching member; and
        forming a storage hole and a first contact hole on each of the red, green and blue color filters, the storage hole exposing a portion of the switching member in correspondence with the storage electrode, and the first contact hole exposing a portion of the switching member in correspondence with the drain electrode,
    wherein the forming of the inorganic insulation layer comprises:
        forming an inorganic material on the color filter layer having the storage hole and the first contact hole formed thereon;
        forming a hole and a second contact hole by patterning the inorganic insulation material, the hole exposing a portion of the color filter layer in correspondence with the TFT, and the second contact hole exposing a portion of the switching member in correspondence with the drain electrode; and
        forming a third contact hole that exposes a portion of the drain electrode through the protective layer.

2. The method of claim 1, wherein the second contact hole is formed on the color filter layer coincidentally through the same process as the third contact hole.

3. A display device comprising:
    a first substrate;
    a second display substrate facing the first display substrate;
    a liquid crystal layer interposed between the first display substrate and the second display substrate; and
    a column spacer disposed between the first display substrate and the second display substrate to maintain a cell gap between the first display substrate and the second display substrate, wherein the first display substrate comprises:
    a switching member including a gate line, a data line crossing the gate line, and a thin-film transistor (TFT) electrically connected to the gate line and the data line;
    a color filter layer formed on the switching member;
    an inorganic insulation layer formed on the color filter layer, the inorganic insulation layer having a spacer hole formed therethrough, which exposes a top surface portion of a color filter of the color filter layer in correspondence with the column spacer; and
    a pixel electrode formed on the inorganic insulation layer, wherein the spacer hole is positioned over a channel portion of the TFT,
    wherein the second substrate comprises:
        a black matrix covering the column spacer; and
        a common electrode facing the pixel electrode.

4. The display device of claim 3, wherein the inorganic insulation layer comprises silicon nitride (SiNx).

5. The display device of claim 3, wherein the color filter layer has a storage hole exposing a portion of the switching member in correspondence with the storage electrode.

6. The display device of claim 3, wherein the switching member comprises:
   a gate insulation layer formed on an insulation substrate having the gate line formed thereon; and
   a protective layer formed on the insulation substrate having the gate line, the gate insulation layer, the data line and the TFT formed thereon.

7. The display device of claim 6, wherein a contact hole is formed through the protective layer, the color filter layer and the inorganic insulation layer to expose a portion of the drain electrode of the TFT.

8. The display device of claim 3, wherein the second display substrate further comprises an overcoat layer for planarizing a surface of the second display substrate having the black matrix formed thereon.

9. A display panel comprising:
   a substrate;
   a plurality of gate lines formed on the substrate;
   a plurality of data lines disposed on the substrate and formed above the gate lines;
   a plurality of thin-film transistors (TFTs) each electrically connected to a corresponding one of the gate lines and a corresponding one of the data lines;
   a color filter layer formed above and separated from the TFTs, the color filter layer including color filter material having a first hardness;
   an inorganic insulation layer formed on and substantially encasing upper and sidewall portion of the color filter layer, the inorganic insulation layer having a second hardness that is greater than the first hardness of the color filter material; the inorganic insulation layer further having a compression accommodating hole formed therethrough, the compression accommodating hole providing for communication therethrough of compression pressure from above it to the filter material below it having the first hardness; and
   a pixel electrode layer formed on the inorganic insulation layer and extending to cover the compression accommodating hole,
   wherein the hole is positioned over a channel portion of the TFT.

* * * * *